3,247,175
PROCESS FOR PREPARING HIGH
CIS-1,4-POLYBUTADIENE
Ross Van Volkenburgh, Baton Rouge, Grover C. Royston, Baker, and James R. Hall, Baton Rouge, La., assignors to Copolymer Rubber & Chemical Corporation, a corporation of Louisiana
No Drawing. Filed July 12, 1962, Ser. No. 209,280
15 Claims. (Cl. 260—94.3)

This invention relates to a process for preparing high cis-1,4-polybutadiene. The invention further relates to a novel catalyst which is especially useful in the polymerization process of the invention, and to a composition and process for preparing the catalyst.

Butadiene has been homopolymerized heretofore employing a catalyst prepared from cobalt salts and ethylaluminum dichloride. However, the polymerization rate is extremely slow and the product is a high molecular weight, tough, gelled polymer which is entirely unsuitable for use as a rubbery material.

It has been discovered that the unsatisfactory cobalt salt-ethylaluminum dichloride catalyst of the prior art may be modified with a chromium compound as a third catalyst component, and that the resultant novel catalyst is very active in the polymerization of 1,3-butadiene. Surprisingly, the polymer produced upon homopolymerization of 1,3-butadiene in the presence of the novel catalyst has a high cis-1,4-configuration, a controlled molecular weight, little or no gel, and it is highly useful as a rubbery material.

It is an object of the present invention to provide a novel catalyst which is especially useful in the polymerization process of the invention, and a process for preparation of the catalyst.

It is a further object of the invention to provide a novel process for polymerizing 1,3-butadiene to produce polybutadiene having a high cis-1,4-configuration.

It is still a further object of the invention to provide novel compositions of matter which are especially useful in preparing the catalyst and/or polymers in accordance with the processes of the invention.

Still other objects of the invention and the attendant advantages will be apparent to those skilled in the art upon reference to the following detailed description and the examples.

In accordance with one important aspect of the invention, a process is provided for preparing polybutadiene having a high cis-1,4-configuration from 1,3-butadiene in which the polymerization is effected in solution in an organic solvent and in the presence of a catalytic amount of the novel catalyst of the invention to be described more fully hereinafter. The process of the invention is especially useful in preparing high cis-1,4-polybutadiene having very desirable properties.

The novel catalyst may be prepared by bringing together in solution in an organic solvent a soluble chromium compound, a soluble cobalt compound, and an organoaluminum dihalide. The soluble chromium and cobalt compounds may be, for example, organic compounds of chromium and cobalt such as their beta-diketone complexes, carboxylic acid salts, etc. Specific examples include chromium acetylacetonate, cobalt acetylacetonate, and cobalt octoate.

The organoaluminum dihalides may be preformed and used in preparing the catalyst, or they may be formed in situ. For example, the organoaluminum dihalide may be formed in situ from a mixture of aluminum halide and one or more components such as triorganoaluminum, aluminum hydride, diorganoaluminum halide or hydride, or dihaloaluminum hydride, in the proper ratio to provide the organoaluminum dihalide. The organic substituent of the organoaluminum dihalide may be, for example, a saturated alkyl, aryl, cycloalkyl, or aralkyl radical containing between 1 and 20 carbon atoms, but preferably 1–4 carbon atoms. Usually, alkylaluminum dihalides are preferred, and especially ethylaluminum dihalide. Good results often may be obtained when the dihalide is a dichloride or dibromide and dichlorides are preferred in most instances.

Combinations of specific chromium compounds, cobalt compounds and aluminum compounds falling within the above categories which give especially good results include chromium (III) acetylacetonate, cobalt acetylacetonate or cobalt octoate and ethylaluminum dichloride. However, it is understood that numerous other satisfactory combinations of soluble chromium compounds, cobalt compounds and aluminum compounds may be used.

When preparing the catalyst, it is preferred that the chromium compound be added to the aluminum compound in solution either before or along with the cobalt compound, and then the resultant catalyst mixture aged for a short period such as from about 15 minutes to an hour or longer. When the chromium compound is added without aging, for instance just before addition of butadiene to be polymerized, catalysts of lower activity are obtained and there is a tendency toward an increased gel content in the polymer. When prepared under preferred conditions, the catalyst is capable of polymerizing 1,3-butadiene to polymers free of gel and with more than 95% of the residual olefin bonds being of the cis configuration. Also, the polymer may be commercially produced with the usual polymerization grade of butadiene, and in fact butadiene containing some 1,2-butadiene is usually preferred since lower chromium to cobalt ratios may be employed with better results.

The catalyst may be preformed, but preferably it is formed in situ in the polymerization solvent. By either method, for best results the chromium acetylacetonate should be added to the organoaluminum dihalide as a precipitate may form at low aluminum to chromium ratios.

It has been found that the rate of polymerization increases and the polymer molecular weight decreases as the ratio of chromium in the catalyst increases. For example, as the amount of chromium is decreased, the polymer molecular weight increases giving gelled polymers at gram atomic weight ratios of chromium to cobalt below about 1:1. Thus, gram atomic weight ratios of chromium to cobalt of at least 1:1 are necessary to control the molecular weight effectively and produce highly useful polymers. Much higher ratios may be used when desired such as 2:1, 10:1, 20:1 or 50:1.

The rate of polymerization and the polymer molecular weight increase as the gram atomic weight ratio of aluminum to cobalt increases. Usually, the gram atomic weight ratio of aluminum to cobalt must be at least 40:1 and preferably 50:1 in order to provide a sufficiently active catalyst, but much higher ratios may be used if desired such as 80:1,100:1 or 200:1, and often as high as 500:1.

As a general rule, butadiene to cobalt mol ratios between 10–20,000 and 100,000 are very satisfactory and may be used. However, lower ratios or higher ratios may be used in some instances. The concentration of butadiene in the solvent may vary over wide ranges, but usually a concentration by weight between about 2–5% and 50% is preferred. In most instances, the concentration should be about 10–20% for best results.

In instances where a highly purified 1,3-butadiene is polymerized, higher chromium to cobalt ratios are preferred than when using polymerization grade 1,3-butadiene that normally contains some allene and/or 1,2- butadiene such as 500–5000 p.p.m. For instance, a gram atomic weight ratio of chromium to cobalt of at least 9 is preferred and often ratios above 12 in order to produce a polymer having a DSV (dilute solution viscosity) in the 1–3.5 range, and preferably in the 1.8 to 2.2 range. Since gram atomic weight ratios of chromium to cobalt of 2–4 are very satisfactory with a commercial grade butadiene containing allene and/or 1,2-butadiene, it is apparent that less chromium is required to give a comparable polymer. Therefore, when the polymerization is carried out in the presence of small amounts of allene and/or 1,2-butadiene, the catalyst cost may be reduced. The allene and/or 1,2-butadiene may be present in amounts by weight up to 1–2%, and preferably about 1000–5000 p.p.m. Amounts as low as 25–50 p.p.m. have some beneficial effect and aid in controlling the molecular weight of the polymer.

The preferred solvent for preparing the catalyst and polymerizing the butadiene usually comprises an aromatic hydrocarbon, but a wide variety of organic solvents may be used. Good results may be obtained with a solvent comprising benzene, toluene, etc., and often combinations of aromatic and aliphatic hydrocarbons are very satisfactory. For instance, by using mixtures of an aromatic hydrocarbon such as benzene in combination with an aliphatic hydrocarbon such as pentane or hexane, it is possible to precipitate out the polymer as it is formed and also control the molecular weight somewhat. The aromatic-aliphatic solvent mixture may contain by volume 10–90% of the aliphatic hydrocarbon and 90–10% of the aromatic hydrocarbon. While the above-mentioned solvents are preferred, it is understood that any satisfactory inert organic solvent may be used.

The reaction mixture containing butadiene and catalyst may be allowed to react under liquid phase conditions for any suitable period of time and temperature. For instance, the reaction may be allowed to take place over a period varying from a few minutes up to several hours such as from about 15 minutes to 12 hours. Often the reaction time may be as short as 15–30 minutes to 2–4 hours. The reaction temperature may vary over wide ranges but usually temperatures below 100° C. are preferred. As a general rule, reaction temperatures less than about 70–85° C. give better results, such as about 20–55° C. However, lower temperatures may be used in some instances such as −25° C. to 0° C. As a general rule, within the above ranges at lower reaction temperatures longer reaction periods are preferred and at higher reaction temperatures shorter periods of reaction are preferred. The catalyst also may be prepared under the above temperature conditions when desired.

The polybutadiene prepared in accordance with the present invention has a very high cis-1,4 content such as 95–100%. Thus, the catalysts of the present invention are unusually effective for the stereospecific polymerization of 1,3-butadiene.

The foregoing detailed description and the following specific examples are for purposes of illustration only and are not intended as being limiting to the spirit or scope of the appended claims.

EXAMPLE I

The data for Example I and subsequent examples were obtained in accordance with the following general procedure, unless otherwise indicated:

Dry 7-oz. beverage bottles capped with self-sealing neoprene liners and crown caps punctured for syringe addition of solvent, catalyst components and monomer were provided. The solvent was added to the bottles and after capping the bottles were purged and pressurized to 10 p.s.i.g. with dry nitrogen. Then, ethylaluminum dichloride was added to the bottles as a 1.0 molar solution in benzene, followed by addition of a 0.02–0.04 molar solution of chromium acetylacetonate ($CrA_3$) in benzene. Finally, the cobalt salt was added as a solution of cobalt 2-ethyl hexoate (cobalt octoate) in benzene.

The polymerization solvent was a reagent grade benzene treated by passing twice over a column of silica gel and stored over sodium ribbon. The solvent was passed through a column of "Drierite" and silica gel during the charging operation. The catalyst was prepared directly in the polymerization solvent and prior to addition of the 1,3-butadiene to be polymerized. In preparing the catalyst in situ, after addition of the ethylaluminum dichloride solution to the solvent followed by the chromium acetylacetonate solution, this portion of the catalyst was allowed to age for about 45–60 minutes before addition of the cobalt octoate solution. After addition of the cobalt octoate, the 1,3-butadiene was added after 10 to 15 minutes.

The polymerization was carried out by tumbling the bottles in a water bath maintained at 24–26° over a 2 hour period unless specified otherwise. At the end of the reaction period, the catalyst was deactivated by addition of a deactivating solution such as phenyl beta-naphthylamine in a benzene-methanol solvent. Thereafter, the polymer was coagulated, washed and dried in a vacuum oven at about 50° C. Polymer microstructure, percent gel, dilute solution viscosity (DSV) and percent yield were determined following the usual conventional procedures widely used and recognized in this art and recorded.

In this example, the effect of the mol ratio of 1,3-butadiene/cobalt at a constant gram atomic weight ratio of chromium/cobalt and a variable gram atomic weight ratio of aluminum/cobalt was studied. The gram atomic weight ratio of chromium/cobalt was maintained constant at 4 and the polymerization was 2 hours at 25° C. The following data were obtained:

*Table I*

| BD/Co | Al/Co | Percent Yield | Percent cis | DSV | Gel |
|---|---|---|---|---|---|
| 10,000 | 50 | 96.5 | 95.2 | 1.37 | 0 |
| 20,000 | 100 | 89.2 | 96.3 | 1.53 | 0 |
| 30,000 | 150 | 79.4 | 96.5 | 1.77 | 0 |
| 40,000 | 200 | 55.4 | 94.7 | 1.84 | 0 |
| 60,000 | 300 | 32.7 | 94.9 | 1.85 | 0 |
| 80,000 | 400 | 21.9 | 93.5 | 1.65 | 0 |
| 100,000 | 500 | 13.1 | 88.7 | 1.21 | 0 |

In the above table and in other portions of the specification, the term "BD" refers to 1,3-butadiene, "DSV" to the dilute solution viscosity and "percent cis" to the percentage of the residual double bonds of the polymer having a cis-configuration.

EXAMPLE II

This example illustrates the effect of the gram atomic weight ratio of aluminum/cobalt at constant 1,3-butadiene/cobalt and chromium/cobalt unit ratios.

The general procedure of Example I was followed in this example. The solvent was 100 cc. of reagent grade benzene, and the polymerization was over a period of 2 hours at 25° C. The mol ratio of 1,3-butadiene/cobalt was 20,000, the gram atomic weight ratio of aluminum/cobalt was varied as noted below in the data, and the gram atomic weight ratio of chromium/cobalt was 4.0. A charge of 0.20 mol of polymerization grade 1,3-butadiene was polymerized in this example.

The following data were obtained:

*Table II*

| mM [1] $EtAlCl_2$ | Al/Co | Percent Yield | Percent cis | DSV | Gel |
|---|---|---|---|---|---|
| 1.0 | 100 | 76.0 | 94.5 | 1.55 | 0 |
| 0.8 | 80 | 74.3 | 96.1 | 1.45 | 0 |
| 0.6 | 60 | 54.0 | 93.8 | 1.36 | 0 |
| 0.4 | 40 | 14.6 | 95.9 | 1.22 | 0 |
| 0.2 | 20 | 0 | ------ | ------ | ------ |

[1] Millimoles.

The above procedure was repeated in a second series of runs with the exception of utilizing a 1,3-butadiene/cobalt ratio of 40,000. The following data were obtained:

*Table III*

| mM [1] EtAlCl$_2$ | Al/Co | Percent Yield | DSV | Gel |
|---|---|---|---|---|
| 0.750 | 150 | 58.9 | 1.64 | 0 |
| 0.625 | 125 | 55.6 | 1.56 | 0 |
| 0.500 | 100 | 52.3 | 1.53 | 0 |
| 0.375 | 75 | 42.6 | 1.45 | 0 |
| 0.250 | 50 | 18.5 | 1.21 | 0 |

[1] Millimoles.

EXAMPLE III

This example illustrates the effect of the gram atomic weight ratio of chromium/cobalt at constant butadiene/cobalt and aluminum/cobalt ratios.

In this example, the general procedure of Example I was followed except as noted. The solvent was 100 cc. of reagent grade benzene, the mol ratio of 1,3-butadiene/cobalt was 20,000, and the gram atomic weight ratio of aluminum/cobalt was 100. A charge of 0.125 mol of polymerization grade 1,3-butadiene was polymerized over a 2 hour period at 25° C.

The following data were obtained:

*Table IV*

| Cr/Co | Percent Yield | Percent cis | DSV | Gel |
|---|---|---|---|---|
| 6 | 87.8 | 96.1 | 1.25 | 0 |
| 5 | 85.2 | 96.2 | 1.37 | 0 |
| 4 | 80.3 | 96.0 | 1.45 | 0 |
| 2 | 60.2 | 95.5 | 2.02 | 0.8 |
| 1 | 62.8 | 95.1 | 2.24 | 16.2 |

EXAMPLE IV

This example illustrates the effect of the butadiene/cobalt ratio at constant gram atomic weight ratios of chromium/cobalt and aluminum/cobalt.

The general procedure of Example I was followed except as noted. The solvent was 100 cc. of reagent grade benzene, the mol ratio of 1,3-butadiene/cobalt was varied, the gram atomic weight ratio of aluminum/cobalt was 100 and the gram atomic weight ratio of chromium/cobalt was 4. The polymerization was over a 2 hour period at 25° C., and a charge of 0.25 mol of polymerization grade 1,3-butadiene was polymerized.

The following data were obtained:

*Table V*

| BD/Co | Percent Yield | Percent cis | DSV | Percent Gel |
|---|---|---|---|---|
| 40,000 | 67.6 | 95.8 | 1.60 | 0 |
| 33,300 | 74.3 | ---- | ---- | ---- |
| 28,600 | 81.9 | 96.3 | 1.62 | 0 |
| 25,000 | 89.4 | ---- | ---- | ---- |
| 22,200 | 90.4 | ---- | ---- | ---- |
| 20,000 | 94.0 | 96.1 | 1.69 | 0 |

EXAMPLE V

This example illustrates the effect of monomer concentration.

The general procedure of Example I was followed except as noted. In this example, 100 cc. of reagent grade benzene was used as a solvent, the mol ratio of 1,3-butadiene/cobalt was 20,000, the gram atomic weight ratio of aluminum/cobalt was 100 and the gram atomic weight ratio of chromium/cobalt was 4. The polymerization was over a 2 hour period at 24° C. and the charge of 1,3-butadiene was as noted below.

The following data were obtained:

*Table VI*

| Moles BD | Wt. Percent BD | Percent Yield | Percent cis | DSV | Gel |
|---|---|---|---|---|---|
| 0.125 | 7.1 | 92.2 | 96.1 | 1.28 | 0 |
| 0.150 | 8.4 | 93.9 | 94.0 | 1.46 | 0 |
| 0.175 | 9.6 | 95.8 | 94.2 | 1.44 | 0 |
| 0.200 | 10.9 | 97.7 | 96.5 | 1.57 | 0 |
| 0.225 | 12.1 | 96.8 | 95.7 | 1.65 | 0 |
| 0.250 | 13.3 | 97.2 | 95.8 | 1.75 | 0 |

EXAMPLE VI

This example illustrates the polymerization of reagent grade 1,3-butadiene containing no 1,2-butadiene as an impurity, and the effects of added diorganoaluminum halide on the catalyst of the invention. The polymerization grade of butadiene referred to in the preceding examples contained approximately 3000 p.p.m. of 1,2-butadiene.

The general procedure was the same as employed in Example I except as noted. In this example, the solvent was 100 cc. of reagent grade benzene and a charge of 0.125 mol of reagent grade 1,3-butadiene was polymerized in each run. Ethylaluminum dichloride was used as the aluminum-containing component of the catalyst of the invention, and diethylaluminum chloride was added thereto in amounts to provide mol ratios to cobalt as noted below. The mol ratio of 1,3-butadiene/cobalt was 20,000, and the gram atomic weight ratios of aluminum/cobalt and chromium/cobalt were as noted in the table below. The polymerization was effected over a 1 hour period at 25° C.

The following data were obtained:

Cr/Co=12

| Et [1]/Co | Et$_2$ [2]/Co | Al/Co | Percent Yield | Percent cis | Percent Gel | DSV |
|---|---|---|---|---|---|---|
| 150 | ---- | 150 | 98 | 94.1 | 0 | 2.96 |
| 100 | 50 | 150 | 78 | 96.4 | 0 | 2.27 |
| 200 | ---- | 200 | 96 | 96.3 | 0 | 3.39 |
| 100 | 100 | 200 | 71 | 95.9 | 0 | 2.22 |

Cr/Co=9

| 150 | ---- | 150 | 97 | 95.7 | 0 | 3.42 |
| 100 | 50 | 150 | 85 | 94.5 | 0 | 2.30 |

Cr/Co=6

| 200 | ---- | 200 | 95 | 96.3 | 20 | 3.45 |
| 100 | 100 | 200 | 63 | 95.9 | 0 | 2.88 |

Cr/Co=9 varying total Al/Co

| 70 | 0 | 70 | 89 | 96 | ---- | ---- |
| 70 | 40 | 110 | 57 | 96 | ---- | ---- |
| 70 | 80 | 150 | 51 | 97 | ---- | ---- |
| 70 | 160 | 230 | 48 | 96 | ---- | ---- |

[1] Ethylaluminum dichloride.
[2] Diethylaluminum chloride.

EXAMPLE VII

This example illustrates the effect of mixed aromatic-aliphatic solvents.

The general procedure was the same as in Example I except as noted. The solvent was a mixture of reagent grade benzene and hexane, and a charge of 0.25 mol of polymeriaztion grade 1,3-butadiene was polymerized. The mol ratio of butadiene/cobalt was 20,000 and the gram atomic weight ratio of aluminum/cobalt was 100 and of chromium/cobalt 3. The polymerization was over a 2 hour period at 24° C.

The following data were obtained:

Table VII

| Vol. Percent Hexane | Percent Yield | Percent cis | DSV | Percent Gel |
|---|---|---|---|---|
| 0 | 93.2 | 95.8 | 1.80 | 0 |
| 10 | 91.2 | 96.1 | 1.70 | 0 |
| 20 | 90.2 | 95.9 | 1.64 | 0 |
| 35 | 86.2 | 96.5 | 1.53 | 0 |
| 50 | 79.4 | 96.1 | 1.42 | 0 |
| 75 | 66.1 | 96.4 | 1.12 | 0 |

EXAMPLE VIII

This example illustrates the effect of order of addition of catalyst components and aging of the catalyst.

The general procedure of Example I was followed except as noted. The solvent was 100 cc. of reagent grade benzene and a charge of 0.20 mol of polymerization grade 1,3-butadiene was polymerized. The mol ratio of 1,3-butadiene/cobalt was 40,000, and the gram atomic weight ratio of aluminum/cobalt was 200 and of chromium/cobalt 4. The polymerization was over a 2 hour period at 24° C.

The following data were obtained:

Table VIII

| Minutes before Butadiene Addition [1] | | | Percent Yield |
|---|---|---|---|
| EtAlCl$_2$ | Co-Octoate | CrA$_3$ | |
| 135 | 0 | 0 | 16.6 |
| 135 | 0 | 60 | 64.8 |
| 135 | 0 | 120 | 72.1 |
| 135 | 60 | 0 | 18.8 |
| 135 | 120 | 0 | 17.6 |
| 135 | 120 | 120 | 70.0 |

[1] 0 aging time listed for catalyst components added 10-20 seconds before the butadiene.

EXAMPLE IX

This example illustrates the effect of the Cr/Co ratio in the catalyst of the invention upon the polymerization of 1,3-butadiene in the presence or absence of 1,2-butadiene.

The general procedure was the same as employed in Example I, except as noted below. In this example, the solvent was 100 cc. of reagent grade benzene and a charge of 0.125 mol or 0.20 mol of 1,3-butadiene was polymerized in each run. The butadiene was of reagent grade (pure) 1,3-butadiene during the first series of runs, and a commercial 1,3-butadiene containing 3,000 p.p.m. of 1,2-butadiene was used in the second series of runs. The polymerization times and temperatures were as noted below, as well as other pertinent data.

The following data were obtained:

The data of Table IX show that lower ratios of chromium to cobalt produce polymers with higher DSV, thereby indicating these polymers to be of higher molecular weight. This is true whether the polymers are produced from a pure 1,3-butadiene, or from 1,3-butadiene containing 1,2-butadiene. In instances where the 1,3-butadiene contains some 1,2-butadiene, then a lower Cr/Co ratio may be used to achieve a given desired molecular weight or DSV. Thus catalyst costs may be lowered by using 1,3-butadiene containing either 1,2-butadiene or allene rather than pure 1,3-butadiene.

The above examples illustrate the use of organoaluminum dichlorides as components for the catalyst. However, it is understood that other corresponding halides such as the bromides and iodies may be used. Also, the conditions of polymerization illustrated herein may be modified when this is desirable. For instance, prior art procedures for the solution polymerization of 1,3-butadiene to produce cis-1,4-polybutadiene in the presence of a Ziegler catalyst are generally satisfactory and may be used. The rubbery polymer products produced in accordance with the invention have a high cis- content and are useful in numerous applications. For example, the cis-1,4-polybutadiene produced in accordance with the process of the invention has physical properties which render it especially desirable in the manufacture of automobile tire tread stocks and rubber articles in general.

What is claimed is:

1. In a process for preparing high cis-1,4-polybutadiene having at least 88% cis-1,4- addition which comprises polymerizing 1,3-butadiene in an organic solvent therefor in the presence of a catalytic amount of a cobalt-containing catalyst which normally produces a substantial amount of deleterious gel, the catalyst being prepared from at least one soluble organoaluminum dihalide in which the organic substituent is selected from the group consisting of alkyl, cycloalkyl, aryl and aralkyl radicals containing 1–20 carbon atoms and at least one soluble cobalt compound selected from the group consisting of the beta-diketone complexes and carboxylic acid salts of cobalt, the improvement of preparing said high cis-1,4-polybutadiene substantially free of deleterious gel by polymerizing the 1,3-butadiene in the presence of a cobalt and chromium-containing catalyst prepared from catalyst forming substances consisting essentially of the said organoaluminum dihalide, the said cobalt compound, and at least one soluble chromium compound selected from the group consisting of the beta-diketone complexes and carboxylic acid salts of chromium, the said organoaluminum dihalide, chromium compound and cobalt compound being present in quanti- Table IX

POLYMERIZATION OF PURE BUTADIENE FOR ONE HOUR AT 25° C.

| BD, Moles | BD/Co | Al/Co | Cr/Co | Percent Yield | Percent cis | Percent Gel | DSV |
|---|---|---|---|---|---|---|---|
| .125 | 20,000 | 100 | 12 | 88 | 95.6 | 0 | 2.45 |
| .125 | 20,000 | 100 | 9 | 94 | 95.7 | 0 | 3.07 |
| .125 | 20,000 | 100 | 6 | 73 | 96.6 | 15.4 | 4.26 |
| .125 | 20,000 | 150 | 12 | 98 | 94.1 | 0 | 2.96 |
| .125 | 20,000 | 150 | 9 | 97 | 95.7 | 0 | 3.42 |

POLYMERIZATION OF COMMERCIAL BUTADIENE CONTAINING 3,000 P.P.M. OF 1,2-BUTADIENE FOR 2 HOURS AT 25–26 °C.

| BD, Moles | BD/Co | Al/Co | Cr/Co | Percent Yield | Percent cis | Percent Gel | DSV |
|---|---|---|---|---|---|---|---|
| .20 | 20,000 | 100 | 3 | 93.2 | 96.1 | 0 | 1.51 |
| .20 | 20,000 | 100 | 2.5 | 93.0 | 96.3 | 0 | 1.61 |
| .20 | 20,000 | 100 | 2.0 | 93.8 | 96.0 | 5 | 1.78 |
| .20 | 20,000 | 100 | 1.0 | 91.3 | 96.0 | 0 | 2.01 |
| .125 | 20,000 | 100 | 6 | 87.8 | 96.1 | 0 | 1.25 |
| .125 | 20,000 | 100 | 5 | 85.2 | 96.2 | 0 | 1.37 |
| .125 | 20,000 | 100 | 4 | 80.3 | 96.0 | 0 | 1.45 |
| .125 | 20,000 | 100 | 2 | 60.2 | 95.5 | 1 | 2.02 |
| .125 | 20,000 | 100 | 1 | 62.8 | 95.1 | 16 | 2.24 | ties to provide a gram atomic weight ratio of aluminum to cobalt between about 40:1 and 500:1 and a gram atomic weight ratio of chromium to cobalt between about 1:1 and 50:1.

2. The process of claim 1 wherein the gram atomic weight ratio of chromium/cobalt is at least 9:1.

3. The process of claim 1 wherein the organoaluminum dihalide comprises alkylaluminum dihalide.

4. The process of claim 3 wherein the chromium compound is chromium III acetylacetonate.

5. The process of claim 1 wherein the catalyst is prepared from alkylaluminum dihalide,
the gram atomic weight ratio of aluminum/cobalt is between about 50:1 and about 500:1,
and the gram atomic weight ratio of chromium/cobalt is between about 2:1 and about 50:1.

6. In a process for preparing high cis-1,4-polybutadiene having at least 88% cis-1,4- addition which comprises polymerizing 1,3-butadiene in an organic solvent therefor in the presence of a catalytic amount of a cobalt-containing catalyst which normally produces a substantial amount of deleterious gel, the catalyst being prepared from at least one soluble alkylaluminum dichloride in which the alkyl group contains 1–20 carbon atoms and at least one soluble cobalt compound selected from the group consisting of the beta-diketone complexes and carboxylic acid salts of cobalt,
the improvement of preparing said high cis-1,4-polybutadiene substantially free of deleterious gel by polymerizing the 1,3-butadiene in the presence of a cobalt and chromium-containing catalyst prepared from catalyst forming substances consisting essentially of the said alkylaluminum dichloride, the said cobalt compound, and at least one soluble chromium compound selected from the group consisting of the beta-diketone complexes and carboxylic acid salts of chromium,
the said alkylaluminum dichloride, chromium compound and cobalt compound being present in quantities to provide a gram atomic weight ratio of aluminum to cobalt between about 50:1 and 500:1 and a gram atomic weight ratio of chromium to cobalt between about 2:1 and 50:1.

7. The process of claim 6 wherein the gram atomic weight ratio of chromium/cobalt is at least 9:1.

8. The process of claim 6 wherein the alkyl group of the alkyl aluminum dichloride contains 1 through 4 carbon atoms.

9. The process of claim 6 wherein the alkylaluminum dichloride is ethylaluminum dichloride.

10. The process of claim 6 wherein the alkyl group of the alkylaluminum dichloride contains 1 through 4 carbon atoms,
the gram atomic weight ratio of aluminum/cobalt is between about 50:1 and about 200:1,
and the gram atomic weight ratio of chromium/cobalt is between about 2:1 and about 20:1.

11. The process of claim 10 wherein the alkylaluminum dichloride is ethylaluminum dichloride, the chromium compound is chromium acetylacetonate, the cobalt compound is selected from the group consisting of cobalt acetylacetonate and cobalt octoate, and the mole ratio of 1,3-butadiene to cobalt is about 10,000:1 to 100,000:1.

12. The process of claim 6 wherein the alkylaluminum dichloride is ethylaluminum dichloride.

13. The process of claim 6 wherein the gram atomic weight ratio of chromium/cobalt is between about 2:1 and about 20:1.

14. The process of claim 6 wherein the solvent in which the 1,3-butadiene is polymerized is a mixed aromatic-aliphatic hydrocarbon solvent containing by volume about 10–90% of the aromatic hydrocarbon and about 90–10% of the aliphatic hydrocarbon.

15. In a process for preparing high cis-1,4-polybutadiene having at least 88% cis-1,4- addition which comprises polymerizing 1,3-butadiene in an organic solvent therefor in the presence of a catalytic amount of a cobalt-containing catalyst which normally produces a substantial amount of deleterious gel, the catalyst being prepared from at least one soluble alkylaluminum dichloride in which the alkyl group contains 1–20 carbon atoms and at least one soluble cobalt compound selected from the group consisting of the beta-diketone complexes and carboxylic acid salts of cobalt,
the improvement of preparing said high cis-1,4-polybutadiene substantially free of deleterious gel by polymerizing the 1,3-butadiene in the presence of about 1000–5000 parts per million by weight based on the weight of the 1,3-butadiene of at least one substance selected from the group consisting of allene and 1,2-butadiene and in the presence of a cobalt and chromium-containing catalyst prepared from catalyst forming substances consisting essentially of the said alkylaluminum dichloride, the said cobalt compound, and at least one soluble chromium compound selected from the group consisting of the beta-diketone complexes and carboxylic acid salts of chromium,
the said alkylaluminum dichloride, chromium compound and cobalt compound being present in quantities to provide a gram atomic weight ratio of aluminum to cobalt between about 50:1 and 200:1 and a gram atomic weight ratio of chromium to cobalt between about 2:1 and 20:1.

References Cited by the Examiner
UNITED STATES PATENTS

| | | | |
|---|---|---|---|
| 2,965,627 | 12/1960 | Field et al. | 260—94.3 |
| 3,094,514 | 6/1963 | Tucker | 260—94.3 |

FOREIGN PATENTS

| | | |
|---|---|---|
| 1,241,011 | 8/1960 | France. |
| 827,365 | 2/1960 | Great Britain. |
| 920,244 | 3/1963 | Great Britain. |

JOSEPH L. SCHOFER, *Primary Examiner.*